(12) United States Patent
Oberheide et al.

(10) Patent No.: US 10,440,016 B2
(45) Date of Patent: Oct. 8, 2019

(54) SYSTEM AND METHOD FOR APPLYING DIGITAL FINGERPRINTS IN MULTI-FACTOR AUTHENTICATION

(71) Applicant: Duo Security, Inc., Ann Arbor, MI (US)

(72) Inventors: Jon Oberheide, Ann Arbor, MI (US); Douglas Song, Ann Arbor, MI (US)

( * ) Notice: Subject to any disclaimer, the term of this patent is extended or adjusted under 35 U.S.C. 154(b) by 318 days.

(21) Appl. No.: 14/955,377

(22) Filed: Dec. 1, 2015

(65) Prior Publication Data

US 2016/0164866 A1 Jun. 9, 2016

Related U.S. Application Data

(60) Provisional application No. 62/089,746, filed on Dec. 9, 2014.

(51) Int. Cl.
*H04L 29/06* (2006.01)

(52) U.S. Cl.
CPC ...... *H04L 63/0861* (2013.01); *H04L 63/0876* (2013.01); *H04L 63/102* (2013.01); *H04L 63/20* (2013.01); *H04L 2463/082* (2013.01)

(58) Field of Classification Search
CPC ... H04L 29/06; H04L 63/0861; H04L 63/102; H04L 63/20; H04L 9/00; H04L 9/32–9/3297; H04L 63/04–63/0492; H04L 63/08–63/0892; H04L 63/10; H04L 63/1408; H04L 63/1416; H04L 67/12; G06F 15/16–15/18; G06F 21/00; G06F 21/30–21/46; G06F 21/60–21/645; G06F 21/554; G06F 2221/033; G06F 9/00; H04N 7/167; H04W 12/00
USPC ....................................................... 726/1–33
See application file for complete search history.

(56) References Cited

U.S. PATENT DOCUMENTS

| | | | |
|---|---|---|---|
| 8,504,831 B2 | 8/2013 | Pratt et al. | |
| 8,793,776 B1 | 7/2014 | Jackson | |
| 8,869,243 B2 | 10/2014 | McGeehan et al. | |
| 8,966,587 B2 | 2/2015 | Nair et al. | |
| 9,088,560 B1 | 7/2015 | Newstadt et al. | |
| 9,098,688 B1 | 8/2015 | Jackson | |
| 2009/0089869 A1* | 4/2009 | Varghese | G06F 21/31 726/7 |
| 2012/0209773 A1 | 8/2012 | Ranganathan | |
| 2012/0304260 A1 | 11/2012 | Steeves et al. | |
| 2014/0173708 A1* | 6/2014 | Garlick | H04L 63/08 726/7 |

* cited by examiner

*Primary Examiner* — Ashokkumar B Patel
*Assistant Examiner* — Quazi Farooqui

(57) ABSTRACT

A method for multi-factor authentication with a first client includes receiving a request associated with the first client, initiating an authentication transaction, generating a digital fingerprint based on a set of client properties collected in association with the first client, identifying a second client from data associated with the authentication transaction, analyzing a digital fingerprint based on a set of stored digital fingerprints; generating a concern metric based on the analysis; and notifying an entity that the login request may have originated from an unauthorized source.

15 Claims, 9 Drawing Sheets

SYSTEM AND METHOD FOR APPLYING DIGITAL FINGERPRINTS IN MULTI-FACTOR AUTHENTICATION

CROSS-REFERENCE TO RELATED APPLICATIONS

This application claims the benefit of U.S. Provisional Application No. 62/089,746 filed Dec. 9, 2014, which is incorporated in its entirety by this reference.

TECHNICAL FIELD

This invention relates generally to the multi-factor authentication field, and more specifically to a new and useful system and method for applying digital fingerprints in multi-factor authentication.

BACKGROUND

Two-factor authentication has emerged as a popular mechanism during the authentication process. With many people having access to smart phones, two-factor authentication can now be completed through a two-factor authentication application. While providing a layer of security, two factor authentication remains vulnerable to different types of attacks. As one type of threat, if a victim lands on an attacker's phishing site, it is possible for the attacker to capture the victim's credentials and execute an attack through normal interactions with a service. Even with two-factor authentication (2FA), a user may approve a 2FA request since they are unaware they are using a proxied site run by an attacker. Thus, there is a need in the two-factor authentication field to create a new and useful system and method for applying digital fingerprints in multi-factor authentication. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.
1. System.

Figure 1:
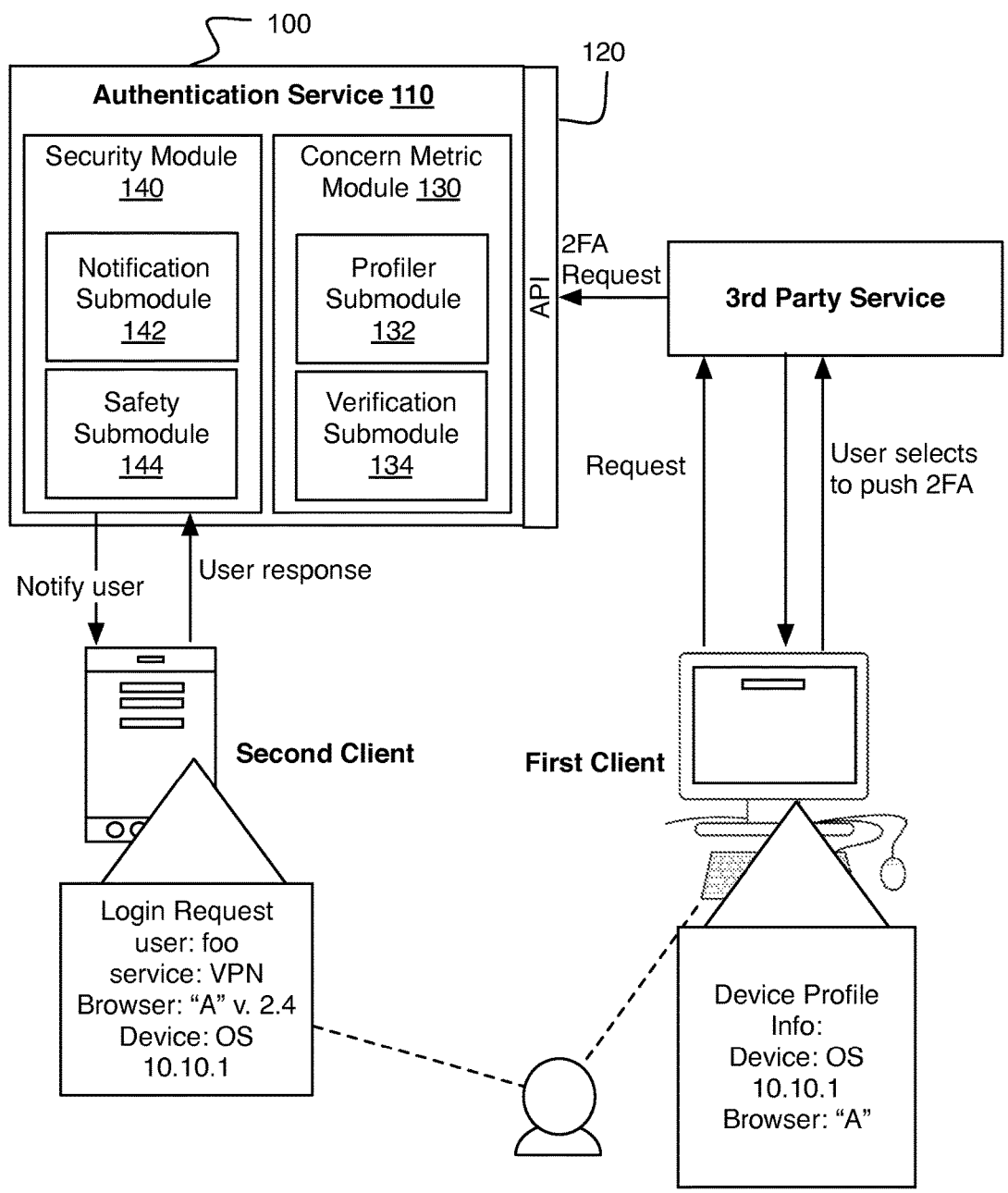
FIG. 1 is a schematic representation of a system of a preferred embodiment in an example normal scenario.
Figure 2:
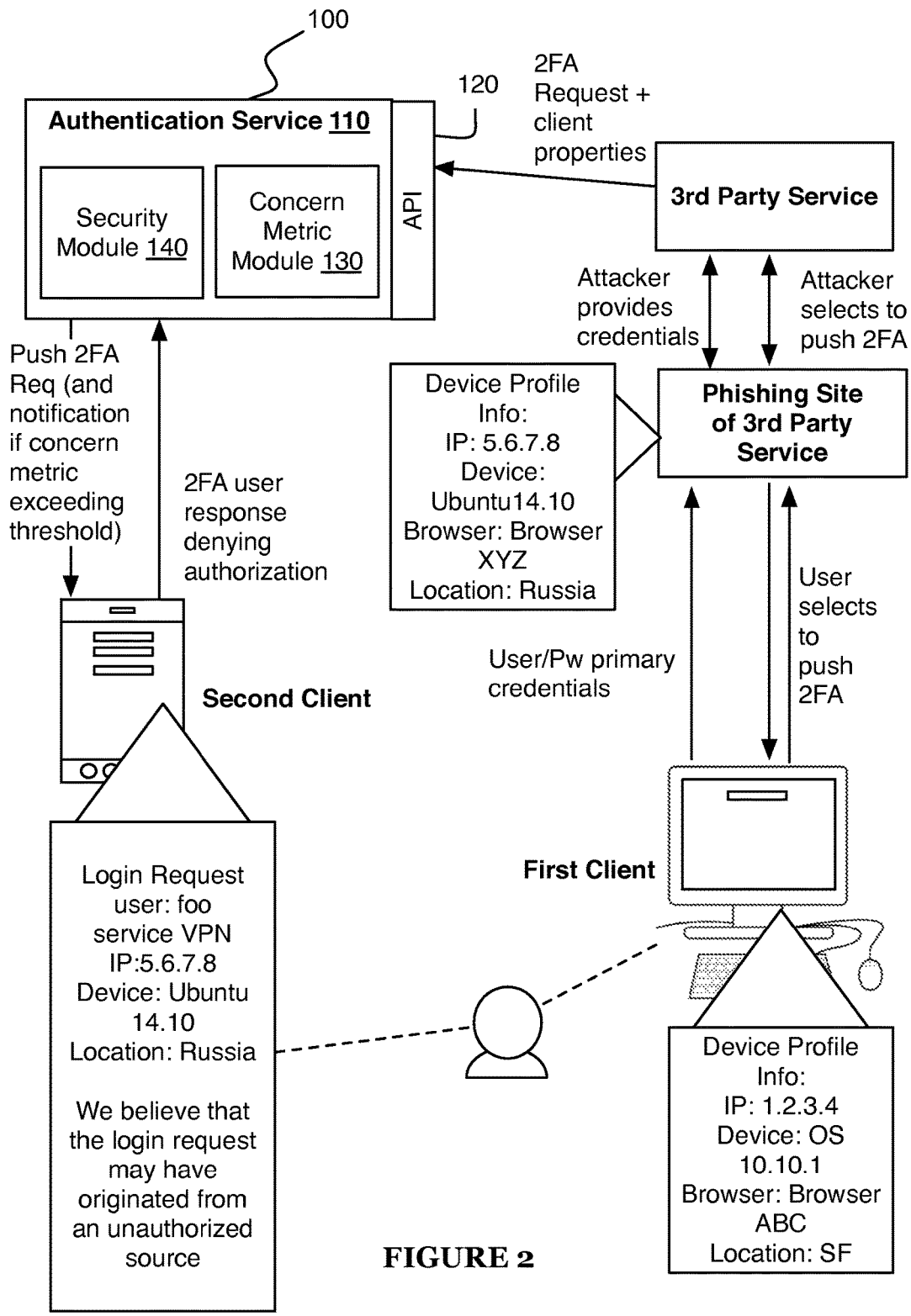
FIG. 2 is a schematic representation of the system of a preferred embodiment in an example attack scenario.
Figure 9:
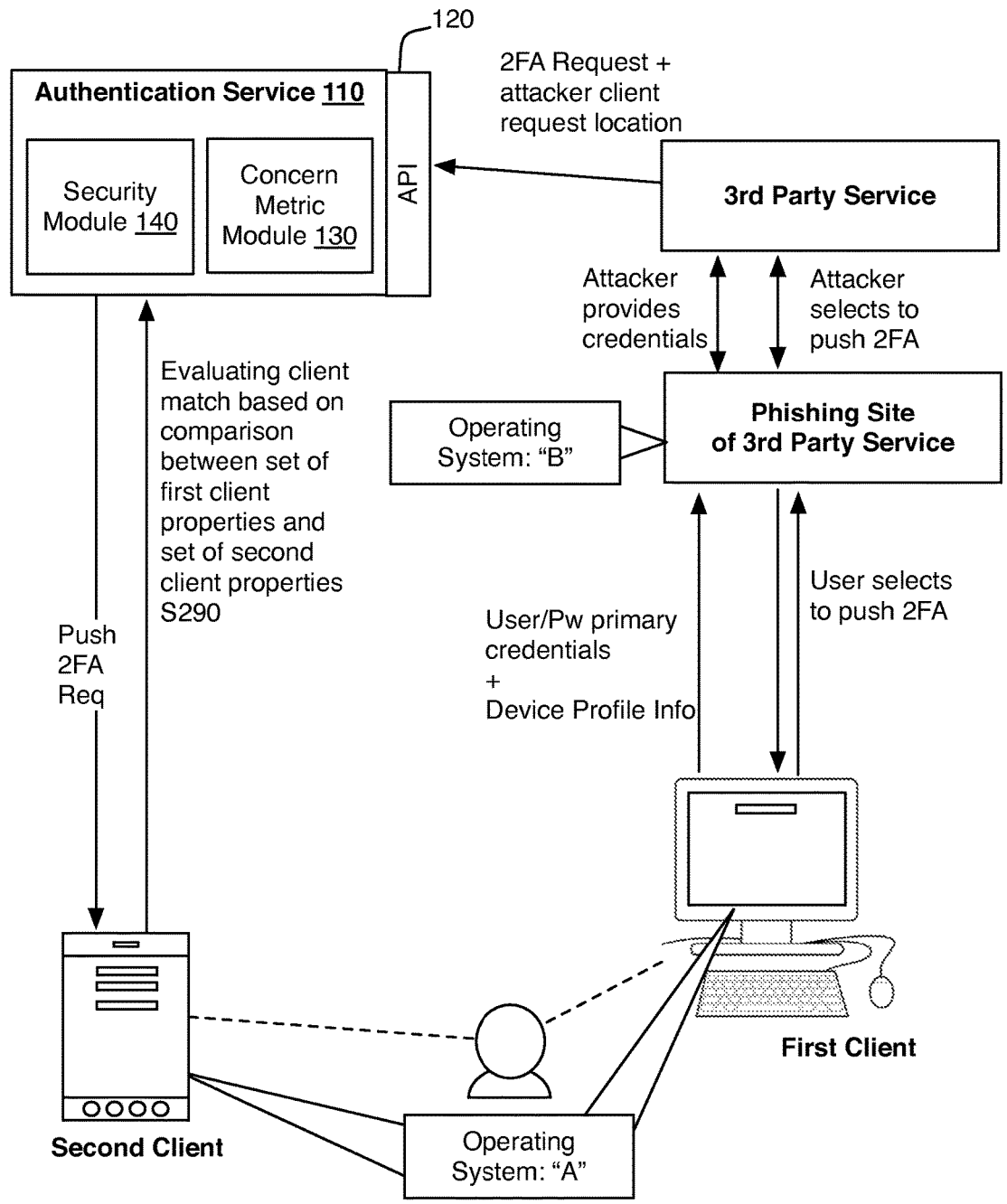
FIG. 9 is a schematic representation of the system of a preferred embodiment in an example attack scenario.

As shown in FIGS. 1, 2, and 9, a system 100 for multi-factor authentication with a first client and a second client includes an authentication service 110, an authentication application programming interface 120, a concern metric module 130, and a security module 140. The system 100 functions to address a security threat vector of a multi-factor authentication process where a user may accidentally provide primary and secondary authentication credentials to an illicitly hosted service proxy (e.g., a phishing site). The system 100 can be particularly applicable to multi-factor authentication systems that depend on a two-factor authentication application.

The system 100 is preferably applied to authentication systems that have at least a first and second client used in authentication. Multi-factor authentication preferably involves user interaction with two distinct client endpoints. In one variation, the first client operates on a first device and the second client operates on a second device, where the first and second devices are distinct (e.g., a desktop computer and a phone). In another variation, the first client and the second operate on the same device but are distinct client instances (e.g., a browser and a 2FA authentication app). The system 100 preferably uses historical usage of a service by one or more accounts to detect irregular patterns in the participating clients. Irregularities are preferably surfaced and notified through the complementary device. For example, if the first client used by an account (such as while accessing a webpage) has a network location in a country never observed for that user, then the second client can be notified in connection with a 2FA request. While the system 100 provides individual account protection, the system 100 can additionally or alternatively provide multi-account protection by using client patterns observed across multiple users.

Examples of a first device and/or second device include a mobile device (e.g., a smartphone), a laptop, tablet, or any other suitable computing device. The device preferably includes a user input (e.g., a keyboard, touchscreen, microphone etc.), a user output (e.g., a display, such as an OLED, LED, plasma, or other digital display, a light, a speaker, etc.), a processor, and a data transmitter. The first and/or second device can additionally include a set of sensors, such as an ambient light sensor, a position sensor (e.g., GPS sensor), an image sensor (e.g., camera), an audio sensor (e.g., microphone), or any other suitable sensor or component.

The system 100 is preferably applied in connection with an authentication service platform, which provides authentication services to other third party services, applications, and platforms. The authentication service platform is preferably multitenant wherein developer accounts can be created to establish an integration of an outside service with the authentication service platform. Preferably, the authentication service platform is a service that facilitates two-factor authentication, and more specifically offers the option of pushing a 2FA request notification to an application on a mobile device of a user. The system 100 can alternatively be an internal authentication service used by controlled set of services. For example, a social network platform may build out an authentication system within their system architecture.

The system 100 preferably adds safeguards to reduce the security threat of a variety of security attack techniques. In a first attack scenario, an attacker sets up a phishing site for a first service that leverages the 2FA services of the system 100. A user of the first service may be tricked into visiting the phishing site and providing his or her primary credentials to the site. In real-time, the attacker can proxy a client interacting with the first service to login as the user. The first service will request the system 100 to push a 2FA request to a device of the user thinking that the proxy client is a legitimate user. The user can receive a push notification notifying them of the 2FA request, and can approve the login attempt without being aware of the attacker proxy device. However, the system 100 preferably leverages digital fingerprints to elevate inconsistent and suspicious client usage patterns so that the user can make informed decision of whether the conditions of the login attempt are consistent with expectations. The system 100 will preferably notify the user on the second client of an unexpected digital fingerprint of the first client. In this scenario, the system 100 will detect that the proxy client of the attacker does not match the normal desktop machine used by the user, and will ask the user to confirm that they are using a new device.

1.1 Authentication Service.

The authentication service 110 functions to act as a hosted multi-factor authentication platform. The authentication service 110 is preferably a multitenant platform that enables multiple outside entities to leverage the service in handling multi-factor authentication. A developer of an application, website, or other networked service can preferably use the authentication service 110 in registering, executing, and verifying two-factor authentication. Preferably, the authentication service 110 supports pushing a notification to an application as an additional form of authentication. However, the system 100 and method 200 of the preferred embodiments may alternatively be applied to messaging, phone calls, and other modes of authentication verification. The authentication service 110 preferably includes an authentication API 120 that facilitates integration with client devices, a concern metric module 130, and a security module 140, but can include or exclude any suitable component. The authentication service 110 additionally includes authentication records that are used in completing two factor authentications. The authentication records may include a mapping between a user identity to a secondary device, cryptographic credentials used in verifying a factor of authentication, history of authentication, and other suitable information. The authentication service is preferably hosted on a distributed computing system and can be accessible over the public internet. The authentication service may alternatively be an internal service such as one hosted on premise within an intranet or in any suitable computing environment.

1.2 Authentication API

The authentication API 120 functions to provide a programmatic interface to the authentication service 110. Developers preferably configure outside applications and services to instruct the authentication service to issue a two-factor authentication request using the authentication API 120. Alternatively, any suitable interface into the authentication service 110 may be used.

The authentication API 120 is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE.

For a given transaction, the authentication service no preferably interfaces with a primary client and/or a secondary client. The primary client is preferably the client instance (device/application) where a user provides primary credentials (e.g., username and password). The secondary client instance is preferably on a device that can act as a "what you have" level of authentication. The primary client and the secondary client may use the authentication API. Alternatively, a first API can be used by primary clients, and a second API used by secondary clients. For example, a RESTful API may be used by a first website to which a user is attempting to login, and push notifications and IP based messaging may be used in interfacing with the secondary client instance.

A primary client can be a browser session with a particular website, a native application, a network connected hardware device, or any suitable client system to which authentication is performed. A secondary client is preferably an application on a personal computing device designed to receive authentication requests, receive user approval, and then transmit a response to verify the user's response. The secondary client is preferably a 2FA application. In one variation, the 2FA application is a general-purpose 2FA application, which can act as a secondary client endpoint for authentication requests of multiple outside services. As an alternative variation, the client application may be a communication application that acts as a communication endpoint for multi-factor authentication. The primary client and the secondary client can alternatively be any suitable application type that can act as distinct client endpoints. The secondary client is preferably able to display client concern notifications. When processing a 2FA request accompanied by a client concern notification, the secondary client will preferably display a notification. In another variation, the user must actively acknowledge or approve a client concern notification before completing 2FA. In some variations, concerns of the secondary client can similarly be conveyed to the first client.

1.3 Concern Metric Module.

The concern metric module 130 functions to generate a concern metric associated with the first client. The concern metric module 130 preferably includes a digital fingerprint submodule 132 and a verification submodule 134. The concern metric preferably indicates a level of concern and/or suspiciousness with respect to the first client that initiated the request (e.g., a request to login to an application with a username and password) and thereby triggered the authentication transaction.

The digital fingerprint module 132 of a preferred embodiment functions to create a data model of client properties used in identifying client devices involved in an authentication transaction. The digital fingerprint module 132 preferably generates digital fingerprints for the initiating client, but may additionally generate digital fingerprints for other involved clients. The digital fingerprints can characterize the device and/or the application used as the client endpoint. The digital fingerprint module preferably uses a set of properties and transforms them into a digital fingerprint. In one variation, the digital fingerprint is a set of properties. In another variation, the digital fingerprint is a device fingerprint, device signature, or digital signature. The digital fingerprint module 132 can leverage client information to form a client digital fingerprint, where client information can include client properties such as browser version/user-agent, operating system version, device type, device capabilities, application identifiers, screen resolution, screen size, functionality support, geographical location, IP address and/or any suitable property of a client.

The verification submodule 134 functions to analyze client properties in assessing the concern metric associated with the first client. The verification submodule 134 preferably analyzes the digital fingerprint of the first client based on a set of stored digital fingerprints. Alternatively, the verification submodule 134 can be configured to compare a set of first client properties and a set of second client properties. Preferably, the verification submodule 134 is configured to retrieve a model and to generate a concern metric based on the predictive model and the digital fingerprint generated by the digital fingerprint module 132. Alternatively, the verification submodule 134 can be configured to retrieve one or more reference digital fingerprints, and to compare the digital fingerprint generated by the digital fingerprint module 132 to the retrieved one or more reference digital fingerprints. However, the verification submodule 134 can analyze the digital fingerprint to assess concern metric in any suitable fashion. Preferably, the verification submodule 134 is configured to generate and update models used for generating the concern metric, but can be configured to generate and updated models used for generating any other suitable output. The verification submodule 134 can alternatively or additionally facilitate comparing digital fingerprints and indicate a comparison metric. Preferably the comparison metric is used in generating the concern metric, but can be used additionally or alternatively to the concern metric. In one variation, the comparison metric is a binary indication of matching or non-matching. In another variation, the comparison metric is a measure of closeness of the match. The comparison metric can alternatively be a probability of a match. The comparison metric may alternatively be any suitable metric, characterization, or other suitable indicator of a comparison result.

1.4 Security Module.

The security module 140 functions to notify an entity of information regarding the authentication transaction, and to process a user response. The security module 140 preferably includes a notification module 142 and a safety module 144.

The notification module 142 functions to notify an entity that a request received in the authentication transaction may have originated from an unauthorized sourced. The notification submodule 142 preferably notifies a user associated with the user account to which a login request was received, but can also notify any other suitable entity (e.g., an administrator, a trusted third-party, etc.). The notification submodule 142 preferably wirelessly notifies the entity, but can also notify the entity through a wired and/or any other suitable means.

The safety module 144 functions to receive and process a user response. Preferably, the safety module 144 wirelessly receives a user response from the second client device, but can receive the user response through any suitable means from any suitable entity. Preferably, the safety module 144 performs security actions in accordance with the content of the user response (e.g., perform actions in response to a user responding to an option to authorize or deny authorization to a request or authentication transaction, an option to update or bypass updating the digital fingerprint history with the digital fingerprint of the first client, an option to change the password of a user account, an option to notify other users or third-parties, an option to lock a user account such as the first user account, etc.). However, the safety module 144 can perform security actions based on and/or in response to any suitable component and/or stimulus. The safety module 144 can preferably process and incorporate a policy configuration received by a user and/or other suitable entity. Alternatively, any suitable component of the system 100 can process and incorporate a received policy configuration.

2. Method.

Figure 3:
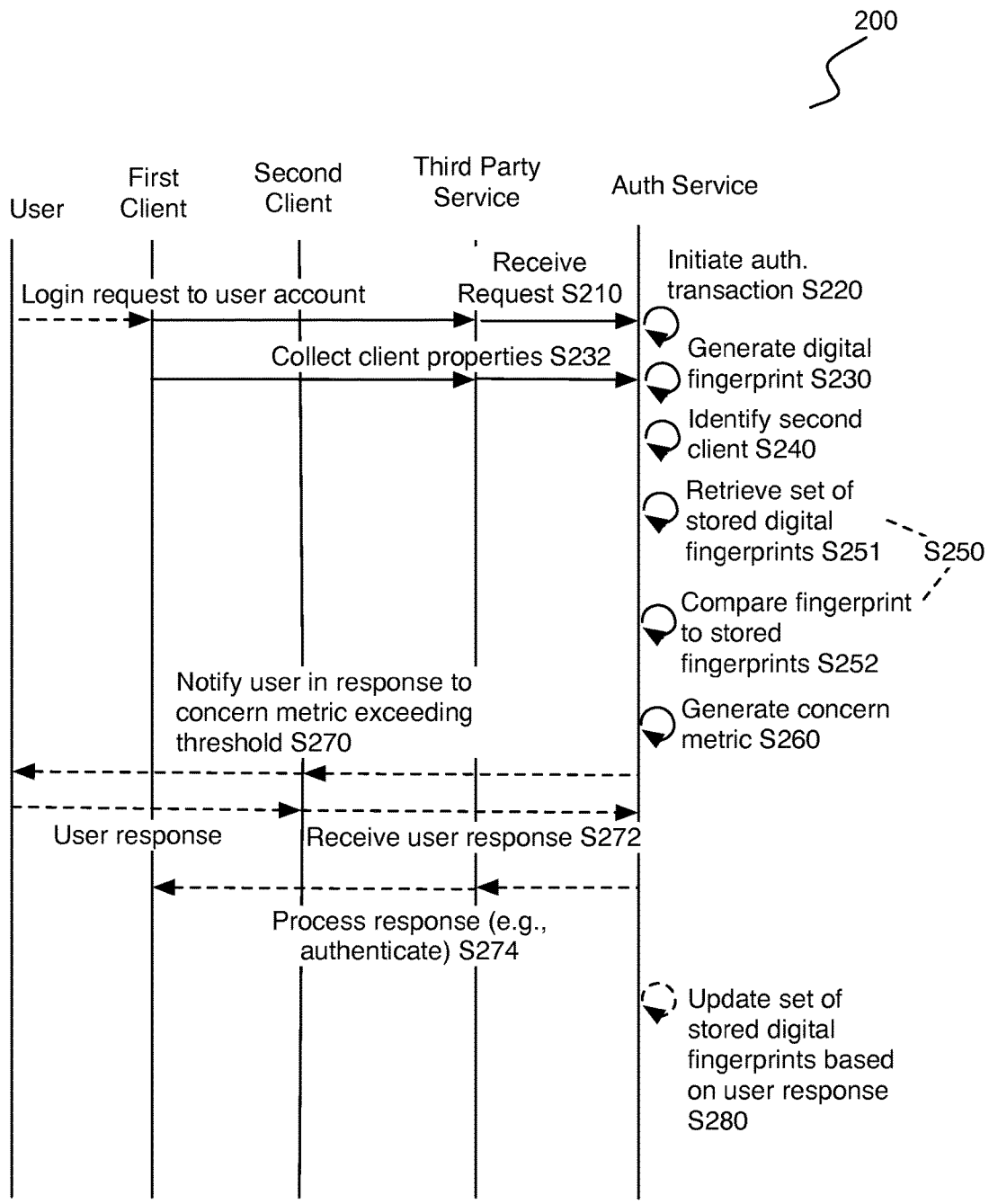
FIG. 3 is a communication flow diagram of a method of a preferred embodiment.
Figure 5:
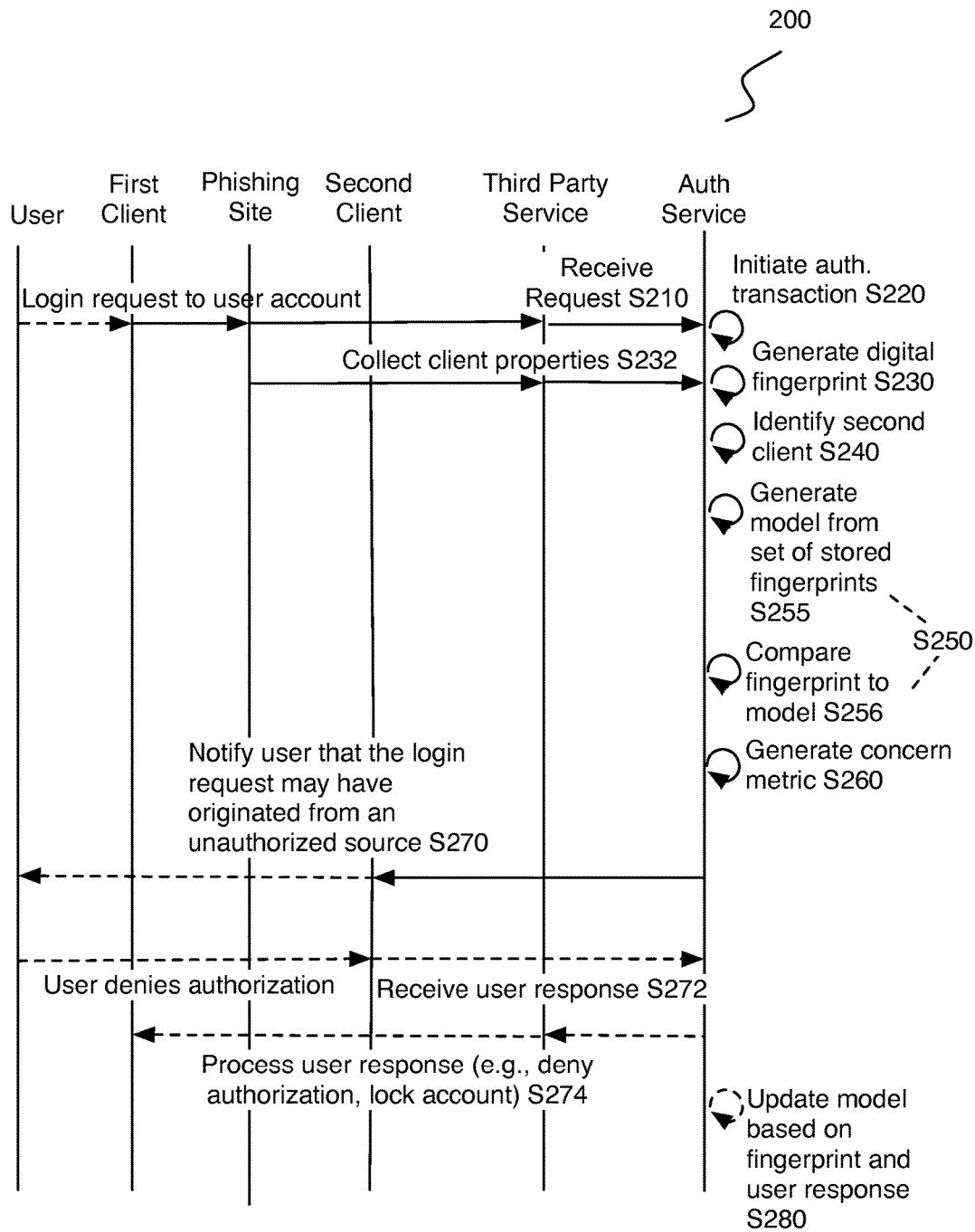
FIG. 5 is a communication flow diagram of the method of a preferred embodiment.

As shown in FIGS. 3 and 5, a method 200 for multi-factor authentication with a first client includes receiving a request as in Block S210, initiating an authentication transaction as in Block S220, generating a digital fingerprint as in Block S230, identifying a second client as in Block S240, analyzing a digital fingerprint as in Block S250, generating a concern metric as in Block S260, and notifying as in Block S270. Additionally or alternatively, the method 200 can include receiving a user response as in Block S272, receiving a policy configuration as in Block S275, updating a model as in Block S280, and evaluating a client match as in Block S290.

The method 200 functions to expose information within an authentication device that a user can use in regulating illicit behavior. The method 200 is preferably applied within a two-factor authentication transaction that involves at least an initial first client and a second client. The first client preferably initiates the authentication transaction and the second client is preferably used in completing some additional layer of authentication/authorization. Additionally, explicit confirmation of digital fingerprint information of a first client may be obtained through the authentication device. The method 200 is applied to mitigate the attack vector of an attacker-initiated authentication transaction.

In one variation, the implementation of the method 200 is a two-factor authentication multitenant platform that is used by multiple distinct services in providing two-factor authentication and/or other types of authentication measures. An attacker can setup a phishing site that acts like a third party system that is using the two-factor authentication platform. In another variation, the system 100 can be part of an internal multi-factor authentication service consumed by the system 100, such as in a social network platform that offers two-factor authentication. The phishing site can pretend to be the system 100 when interfacing with the user and pretend to be a browser of the user when interfacing with the system 100.

As shown in FIG. 5, one exemplary attack scenario that can be addressed by the method 200 may be when a victim lands on a phishing site of an attacker. The attacker can capture primary credentials from the user and then fake normal interaction with a two-factor authentication platform. That will result in pushing a 2FA request to an authentication device of the user (e.g., push notification to a 2FA app on a user's phone). The method 200 preferably dynamically exposes information about the initiating client to alert the user of suspicious activity. As one example, the user may be notified in a 2FA push notification that this request originates from a login request by a machine in Russia. If the user is not located in Russia, this can be a signal that an attack may be in progress—the user can deny approval of the authentication to prevent the attack.

2.1 Receiving a Request.

Block S210, which includes receiving a request, functions to receive communication from a first client to be authenticated. Preferably, the request is a login request associated with a user account (e.g., through supplying a unique identifier such as a username/password, fingerprint, voice activation, primary credentials, social security number, bank account number, etc.) associated with a service provider who is utilizing the authentication service. Alternatively, the request is an applications request to perform a particular action (e.g., downloading, storing, communicating, etc.). However, the request can be any suitable request that could warrant authentication of a client making the request. Preferably, the request is received from the first client, but can be received from any suitable client, user, or entity. The request is preferably received wirelessly (e.g., via WiFi, Bluetooth, SMS, etc.) from the first client operating on the first device, but can alternatively be received through a wired electrical connection (e.g., a micro-USB connector, a USB on-the-go connector, a Firewire connector, a Lightning Connector™). However, the request can be received through any suitable means.

2.2 Initiating an Authentication Transaction.

Block S220, which includes initiating an authentication transaction, functions to begin the authentication transaction associated with a request. Preferably, the authentication transaction is initiated in response to a request (e.g., a request received as in Block S210). Alternatively, the authentication transaction may be initiated by an authentication service in response to a result of analyzing the request received by the first client (e.g., analyzing the type of request, metadata associated with the request, the service provider that the request is attempting to access, etc.). However, the authentication transaction may be initiated in response to any suitable stimulus and/or through any suitable means. Preferably, the authentication transaction is initiated in response to a login request—from the first client—associated with the first user account. Alternatively, the authentication transaction can be initiated in response to a login request from any suitable client and/or associated with any suitable user account. However, the authentication transaction can be initiated in response to any suitable type of request from any suitable entity. The authentication transaction is preferably initiated by the authentication service, but can also be initiated by any suitable component.

2.3 Generating a Digital Fingerprint.

Block S230, which includes generating a digital fingerprint associated with a client, to generate a fingerprint from client properties characterizing a client and/or client device. Block S230 can include collecting client properties as in Block S232.

Preferably, client properties are used to form a digital fingerprint for each unique instance of receiving a request by a first client operating on a first device. A digital fingerprint can also be generated only in certain situations. In one example, the collected client properties exactly match previous client properties collected for a given type of request, thereby immediately indicating a legitimate request by the first client. In this example, the digital fingerprinting step can be bypassed, and the first client request can be authorized. In another example, digital fingerprints are only generated when the request is received from a particular type of client, device, affiliation, and/or when the request is for a particular application, service, action, etc. However, the digital fingerprints can be generated at any suitable time and at any suitable frequency. Multiple digital fingerprints can also be generated for a single received request. For example, for a request to access confidential electronic health records, a first client digital fingerprint can be generated based on the device that the first client is operating on. In the example, a medical digital fingerprint can also be generated based on information associated with a medical device linked to the first client device. However, any number of digital fingerprints can be generated for any number of received requests and/or authentication transactions. Preferably, the digital fingerprint is generated in response to collecting the client properties of the first client. Alternatively, the client properties of the first client can be stored, other steps can be performed, and then the digital fingerprint can be generated. Each authentication transaction instance preferably includes the generation of a digital fingerprint of an involved authentication device. However, the digital fingerprint can be generated at any suitable time and/or generated in any relation to the other steps of the method 200.

Preferably, generating the digital fingerprint involves processing the client properties collected from the first client. Processing the client properties can include steps of normalization, combination, filtering, transforming, and/or any other suitable type of processing. In a first example, a set of collected client properties can be processed to give an indication as to other client properties. In an illustration of this example, device usage properties can be collected from a first client, where the particular device usage properties give an indication as to properties of the intrinsic device (e.g., a particular version of an operating system of the device may indicate a particular device type). In this illustration, the particular device usage properties can be mapped to a particular intrinsic device property that is used in generating the digital fingerprint. In a second example, a confidence level in the validity of the client property is used in filtering out low-confidence client properties from the pool of client properties. In an illustration of this example, biosensor data (e.g., from a wearable medical device, from an implantable device, etc.) is included in the collected client properties. If the biosensor data is noisy and/or in a form not recognized by the authentication service, then the biosensor data may be assigned a low-confidence level and filtered out. Preferably, multiple different fingerprint vectors can be generated that contribute to the device profiling, wherein a fingerprint vector is a profiling component for a particular type of information (e.g., device usage information, intrinsic device information, sensor information, etc.). Alternative, a single vector can be generated for a digital fingerprint, or no vectors can be generated.

In a first variation, generating the digital fingerprint involves creating a feature set based on the client properties, where the feature set can be used in a model for generating a concern metric associated with the first client. Preferably, features from the feature set include collected client properties in raw form as well as client properties in processed form (e.g., normalized, combined, filtered, transformed, etc.). Alternatively, the feature set can include raw client properties exclusively or processed client properties exclusively. However, the feature set can include any number of features based on any number of client properties in any form.

In a second variation, multiple digital fingerprints can be used in generating a digital fingerprint history for use in authenticating at least one entity. Preferably, the multiple digital fingerprints are collected over time across multiple authentication transactions. However, the multiple digital fingerprints used in forming a device history can be generated from a single authentication transaction. Preferably, a device history can be collected for a set of different user accounts. A given user may have a different set of devices and device connection scenarios (e.g., networks) used when authenticating. The device history is preferably a collection of digital fingerprints that were generated from previous successful authentication transactions. As shown in FIG. 3, collecting and storing digital fingerprints is preferably accomplished in combination with using digital fingerprints as an authentication factor within the authentication system.

In a third variation, the method 200 may enable digital fingerprint patterns within a subset of accounts or within a parent account to be used in evaluating authentication transaction concerns. For example, company ABC may setup all employees to use a particular system with particular devices. The digital fingerprint of an employee account accessing the system may be substantially similar to the digital fingerprints of other employees (e.g., using the same operating system, same client type, accessing the system from the same bank of IP addresses).

The digital fingerprints collected for clients involved in authentication transactions may result in a client fingerprint used in (or suspected of) illicit use of the system 100. The method 200 can additionally include recording illicit digital fingerprints, which functions to establish a history of devices that are frequently used in suspicious behavior or in verified attacks. Such illicit digital fingerprints can be used across multiple accounts when exposing authentication transaction concerns. If a digital fingerprint has a higher match with an illicit digital fingerprint than a digital fingerprint of the associated account, the authentication transaction can be prevented or a secondary device warning can be triggered. The illicit digital fingerprints can be used in preventing attacks on fingerprints with no or little digital fingerprint history. Digital fingerprints are preferably collected for substantially each client involvement with an authentication transaction. Accordingly, a client fingerprint is captured and then evaluated. If the client fingerprint is determined to be an illicit fingerprint, the digital fingerprint can label, categorized, or otherwise stored with an association to illicit digital fingerprints. A digital fingerprint can be labeled an illicit fingerprint through automatic comparison to historical digital fingerprints of the account, through user confirmation of a concern notification on a second client device, or through any suitable approach.

However, a digital fingerprint can be generated without processing the client properties collected from the first client, and/or can be generated in any suitable fashion.

2.3.1 Generating a Digital Fingerprint: Collecting Client Properties.

Block S232, which includes collecting client properties associated with an authentication device, functions to generate a collection of properties for use in verifying the legitimacy of the first client. A successful authentication transaction preferably involves a user using a first client to access a first service provider. Client properties can be collected to characterize the first client and how the first client connected to the service. The client properties can be passed to the authentication service through the service provider. Properties that may be collected and used in forming a digital fingerprint include device usage properties (e.g., application usage, communication patterns, geographical location, time of day, IP address, network, etc.), device operation properties (e.g., browser version/user-agent, operating system version, plugin version device type, device capabilities, application identifiers, screen resolution, screen size, functionality support, etc.), sensor information (e.g., information from position sensors, location sensors, temperature sensors, pressure sensors, light sensors, current sensors, proximity sensors, clocks, touch sensors, vibration sensors, and/or any other suitable sensor), and/or any suitable property of a client. Preferably, the client properties are used to form a digital fingerprint for each unique instance of a device. Client properties may additionally include contextual properties such as frequency of networks used, browsers used, applications used, locations and/or any other suitable contextual properties. For example, a tablet (e.g., a first client) used to access a website (e.g., a service provider) may often use a home network and a work network. Use of the tablet from outside those two networks may be an indicator for concern.

Preferably, the client properties are collected by accessing information from the first client device using various SDKs or interfaces of the operating system and other installed applications. Alternatively, the client properties can be collected from a service provider to which the request was made, and/or any other suitable entity that possesses information associated with the first client, the first client device, the request from the first client, a user account, and/or any suitable component. The collected client properties may not enable uniquely identifying the first client or the first client device, but the client properties may include a secure token, key, or signature that relates to the first client or first client device. The client information can relate to intrinsic properties or configurations of the first client or first client device, but can additionally include information that relates to the manner of usage, settings, and preferences of a user.

In a first variation, collecting client properties includes accessing intrinsic device information including device operating system version, component versions, hardware properties, SIM card ID, UDID, application/advertiser ID and/or other device properties. Some of these intrinsic device properties, such as operating system version and software version values may be variable over the life of the device. Some intrinsic device properties, such as hardware versions and UDID can be substantially fixed over the life of the device. The intrinsic device properties can enable assessment of whether the physical device associated with the first client has changed.

In a second variation, creating a digital fingerprint can include accessing device usage information, which functions to reflect the impact a user has on the state of a device. The device usage information can come from static configuration data and/or usage patterns. Users will use a device in very individualized manners. Static configuration data can include user generated or stored content or configuration. The static configuration data are static in the sense that they are preferably not substantially a function of time. Static configuration data can include media files, system settings, and other user influenced properties. Users will have different music collections, have different photo albums, have different contact lists, use different applications, and use their devices in different locations, among other forms of unique usage properties. In accessing user customization, permission can be requested from the device to access location information, contact list information, photos, videos, music, and other portions of a file system or application. A set of items, such as a music collection, provides a unique signature of who is using the device. Static configuration usage information can include cataloging a list of media in a collection. The media can be songs, playlists, movies/videos, photos, installed apps, contacts, and other collections of media. The cataloging can additionally be specialized to outside applications if access is granted. For example, the stocks added to a stock app could similarly be used. The cataloged list may be algorithmically condensed to some token, hash, or comprehensive signature. The cataloged media list can alternatively be a corpus of items. The collections can alternatively or additionally be processed to determine patterns within the collections. For example, face identification can be applied across the photos to determine a set of faces and a histogram prediction of their frequency. In another example, the music song names are processed to generate a signature reflective of the style of music the user prefers. With respect to system preferences, accessibility features, language settings, audio or display settings, communication settings (e.g., Bluetooth) setup social network identities, and other aspects may be queried through OS interfaces or other suitable mechanisms.

Leveraging device usage information can also include leveraging device usage pattern information that can include tracking device usage over a period of time, which can be used to generate a usage pattern. The usage pattern can relate to location information, application usage, contact communication patterns, physical activity (e.g., using inertial monitoring units measure amount of exercise or physical motion of the device), or any suitable pattern. One usage pattern can relate to social network applications operating on the client device. Social network usage patterns can include posting habits, viewing habits, connections properties (e.g., number of friend connections, type of friend connections), interests, social network fingerprint information, and/or any other suitable property related to social network usage. Another exemplary usage pattern vector can include monitoring location periodically over the week to determine location patterns of a user to create a location vector of the digital fingerprint. Similarly, network access can be queried over time and patterns of network access (e.g., SSID information) over time can be tracked over time. The device usage information can have a high correlation to the unique manner a user uses a particular type of device. To copy device usage portions of the digital fingerprint, the usage of a user would have to be understood and simulated in another device instance. For example, with a music vector, the music collection of a user would have to be simulated. In the case of a photo collection, the photos are highly unique and would be very difficult to replicate. Thus, the device usage vectors can be used to verify identity when a physical device changes. Some user customization vectors will be preserved even if the device changes. For example, a user will update a new phone to use a backed up contact list, which can be used as a user customization vector in the digital fingerprint. Even after the physical device changes and a new instance of the authentication application are installed, a subsequent digital fingerprint can still map to the reference digital fingerprint because of the device usage vectors.

However, any suitable client property, type of client property, number of client properties, and/or manner of collecting client properties may be employed in Block S232.

2.4 Identifying a Second Client.

Block S240, which includes identifying a second client, functions to identify a second client associated with the user account, where the second client is involved in the multi-factor authentication. Preferably, the second client is operating on a second client device that is different from the first client device. Alternatively, the second client can be operating on the same device as the first client device. However, the first client and the second client can operate on any suitable number or combination of devices. Preferably, the second client is operating on a client device that has been enrolled with the authentication service. Additionally or alternatively, the second client can be identified with data associated with the first user account. However, the second client can be identified from the user, the first client, an administrator, an institution, and/or any other suitable data source.

2.5 Analyzing a Digital Fingerprint.

Block S250, which includes analyzing a digital fingerprint, functions to process a digital fingerprint for evaluating a suspiciousness associated with an authentication transaction. Analyzing a digital fingerprint as in Block S250 can additionally or alternatively include: Block S251, which includes retrieving a digital fingerprint; Block S252, which includes comparing digital fingerprints; Block S255, which includes generating a model; and/or Block S256, which includes analyzing based on the model. Preferably, a first client digital fingerprint of the first client (e.g., a first client digital fingerprint generated in Block S230) is analyzed, but any suitable digital fingerprint can be analyzed. Preferably, analyzing a first client digital fingerprint is based on a first set of stored digital fingerprints associated with a first user account, where the first set of stored digital fingerprints comprises digital fingerprints stored from previous authentication transactions associated with the first user account. However, analyzing a digital fingerprint can be based on any number of stored digital fingerprints associated with any suitable user account, user, client, group, institution, and/or other entity. Analyzing a digital fingerprint preferably includes analyzing device usage properties (e.g., device usage properties tracked over time), device operation properties, and/or any other suitable client properties.

2.5.1.A Analyzing a Digital Fingerprint: Retrieving a Digital Fingerprint

As shown in FIG. 3, Block S251, which includes retrieving a digital fingerprint, functions to retrieve reference digital fingerprints to compare against the generated digital fingerprint of S230. Preferably, the concern metric module retrieves the one or more reference digital fingerprints from a remote server or database storing the reference digital fingerprints. The reference digital fingerprints are preferably retrieved through a wireless network (e.g., WiFi, cellular network, etc.), but can alternatively be retrieved through a wired connection or through any other suitable communications link. However, a reference digital fingerprint can be retrieved from any suitable entity through any suitable means. The retrieved reference digital fingerprints are preferably from a digital fingerprint history (e.g. a set of stored digital fingerprints) associated with the request from the client that initiated the authentication transaction. For example, a digital fingerprint history can be associated with a user account, where the digital fingerprint history includes stored digital fingerprints that have been generated in response to login attempts to the user account. When a subsequent client attempts to login to the user account, one or more reference digital fingerprints can be retrieved from the digital fingerprint history associated with the user account. Alternatively, the reference digital fingerprints can be independent of a digital fingerprint history associated with the specific request. For example, an illicit digital fingerprint (e.g., a digital fingerprint that has been categorized has belonging to a phishing site) can be the retrieved reference digital fingerprint. The illicit digital fingerprint can be from a global illicit digital fingerprint list generated from collecting all digital fingerprints that have been labeled as an illicit digital fingerprint across any authentication transaction irrespective of request, user account, client, client device, and/or any other suitable entity. Preferably, a first set of stored reference digital fingerprints is associated with the first user account, but any suitable number of sets of stored reference digital fingerprints can be associated with any number of clients, users, user accounts, institutions, affiliations, etc. However, the reference digital fingerprint can be any suitable digital fingerprint that has been generated and/or stored.

In a first variation, the reference digital fingerprint can be a composite digital fingerprint. Preferably, the composite digital fingerprint is generated from multiple individual digital fingerprints. Alternatively, the composite digital fingerprint is generated from multiple sets of client properties collected across multiple authentication transactions. However, the composite digital fingerprint can be generated from any suitable source of data. The composite digital fingerprint is preferably generated by combining or selecting properties from individual digital fingerprints. For example, a user account has an associated digital fingerprint history that includes digital fingerprint "A" and "B." Digital fingerprint "A" made a login request to the user account at 8:00 AM on a given day, and digital fingerprint "B" made a login request to the user account at 9:00 AM on a given day. A composite digital fingerprint could have a characteristic login request time of day of 8:30 AM, e.g., an approximate middle of 8:00 AM and 9:00 AM. In another example, a user account has an associated digital fingerprint history that includes digital fingerprint "A," "B," and "C." Digital fingerprints "A" and "B" made requests to update a particular application through an app store. Digital fingerprint "C" made a request to update the application through an internet browser. Given that the digital fingerprints have a higher frequency of requesting to update the application through the app store, the composite digital fingerprint of digital fingerprints "A," "B," and "C," would have the characteristic of favoring application updates through the app store. Alternatively or additionally, the composite digital fingerprint can be generated based on metadata associated with the client properties of the individual digital fingerprints. For example, if certain client properties across the individual digital fingerprints are associated with a higher confidence level of validity (e.g., a higher confidence that the device usage patterns are accurate), then those client properties can be selected for the composite digital fingerprint. The composite digital fingerprint can also be a composite illicit digital fingerprint. Preferably, the composite illicit digital fingerprint is generated from multiple individual digital fingerprints. However, the composite illicit digital fingerprint can be generated from both illicit digital fingerprints and legitimate digital fingerprints, such as from processing the illicit and legitimate digital fingerprints to gain insight into distinctions between the two categories of digital fingerprints. However, the composite digital fingerprint can be generated through any suitable means, using any client property or number of client properties associated with individual digital fingerprints.

In a second variation, the one or more reference digital fingerprints can include a digital fingerprint that is a third-party digital fingerprint obtained through third-party sources. For example, properties of illicit users, user accounts, clients, requests, affiliations, etc. can be obtained from third-party services collecting such information. Digital fingerprints can be generated based upon the properties obtained from the third-party services, and the digital fingerprints can be used as reference digital fingerprints. However, reference digital fingerprints can be obtained and/or generated from any suitable source.

In a third variation, the one or more reference digital fingerprints can include a digital fingerprint that is retrieved based on time criteria with respect to when digital fingerprints from the pool of potential reference fingerprints were generated. Selection of the reference digital fingerprint through using time criteria can be based on age, frequency within a time span, chronological order, and/or any other type of time criteria. For example, if the pool of potential reference fingerprints constitute all reference fingerprints generated in association with an institution (e.g., a university, a company, a government, a group, an interest club, an organization, etc.), the retrieved reference fingerprints may be the three most recently generated reference fingerprints for the institution.

In a fourth variation, the one or more reference digital fingerprints are custom-created. Preferably, the user generates the custom-created reference digital fingerprints, but an administrator of the authentication service, an institution, a third-party, the service provider, and/or any other suitable entity can also create the custom-created reference digital fingerprints. Preferably, the custom-created reference fingerprints are created by identifying desired properties for the reference digital fingerprint without referring to any stored digital fingerprints. As such, custom-created reference fingerprints can be created for an entity in situations when no digital fingerprints have yet been generated in association with the entity. For example, at a new company that has chosen to use a particular brand of device as the platform for the company's employees, the company can create a custom digital fingerprint with a device property of the chosen brand. Alternatively, the custom-created reference digital fingerprint can incorporate elements from stored digital fingerprints as well as properties selected by the user independent of stored digital fingerprints. For example, a user can specify that the reference digital fingerprint has an operating system version within a range of versions selected by the user, and the user can specify that the screen resolution property be based upon screen resolutions of stored digital fingerprints of a digital fingerprint history associated with the user. However, the custom-created reference digital fingerprints can incorporate elements from any data collected, generated, and/or stored in any of the steps of the method 200.

2.5.1.B Analyzing a Digital Fingerprint: Comparing Digital Fingerprints

Figure 4:
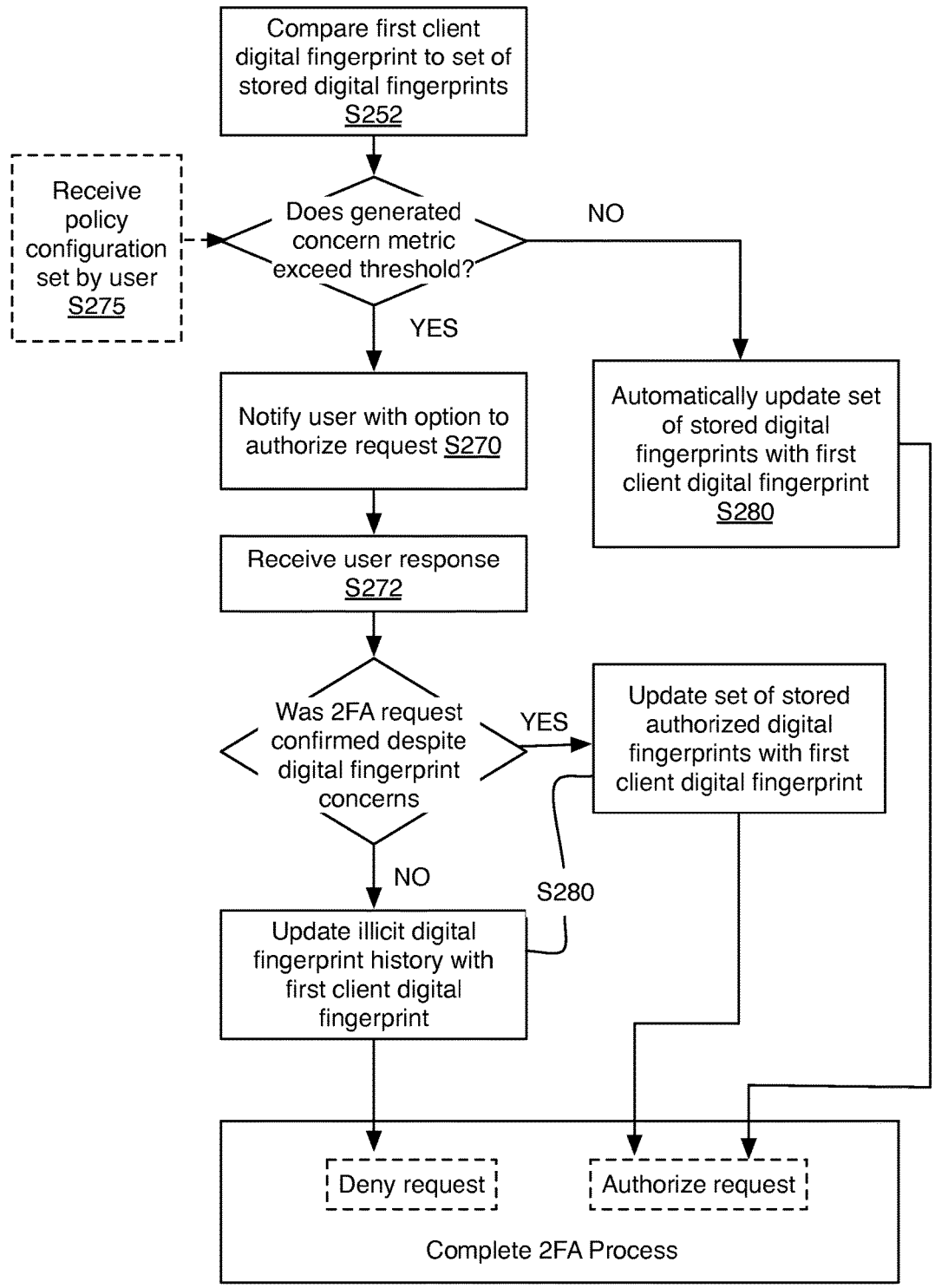
FIG. 4 is a diagram of the method of a preferred embodiment.

As shown in FIGS. 3-4, Block S252, which includes comparing digital fingerprints, functions to process multiple digital fingerprints in analyzing a digital fingerprint associated with the authentication transaction. Preferably, the digital fingerprint generated in Block S250 is compared to the reference digital fingerprint or fingerprints retrieved in Block S251. Alternatively, the digital fingerprint generated in Block S230 is compared to stored digital fingerprints that were not retrieved in Block S251. A digital fingerprint is preferably compared to a digital fingerprint associated with an account, a digital fingerprint history, a user, a client type, a request type, an institution (e.g., set of company accounts), a group, an affiliation, and/or any suitable scope. However, digital fingerprints generated and/or stored in any step can be compared in order to generate a corresponding concern metric. Preferably, the result of the comparison can be a metric of the level of match of the digital fingerprint, which may be used as a measure of device similarity (e.g., a digital fingerprint similarity vector, a similarity score, a similarity percentage, a grade, etc.) upon which the concern metric can be based. For example, the result of the comparison can be an indication that the digital fingerprint highly corresponds to the device history (e.g., indicating a low concern metric) from which the reference digital fingerprints were pulled, or does not correspond to the device history (e.g., indicating a high concern metric). Alternatively, the direct result of the comparison is the concern metric. However, the comparison can be used in any suitable manner to generate the concern metric.

In a first variation, comparison of digital fingerprints as in Block S252 can identify for strict differences. A strict difference constitutes any difference—no matter the extent of the difference—in one or more properties of a digital fingerprint. For example, if the operating system version number of a digital fingerprint generated in S230 has no match with any of the retrieved reference fingerprints of S251, that distinction can be labeled a strict difference. For a given property of the digital fingerprint, a strict difference is preferably identified when there is no match between a property of the digital fingerprint and any of the properties for the reference digital fingerprints. Alternatively, a strict difference can be identified when there is at least one mismatch between the value of the property of the digital fingerprint and the values of the property across the reference digital fingerprints. However, a strict difference can be identified in any suitable manner.

In a second variation, comparison of digital fingerprints as in Block S252 can identify the extent of the differences between digital fingerprints. Preferably, comparison can evaluate the extent of differences in values of the same property type across different digital fingerprints. For example, if two digital fingerprints possessed values for a device usage property of frequency of phone calls, where digital fingerprint "A" had a frequency of five phone calls a day, and digital fingerprint "B" had a frequency of one phone call a month, comparison as in Block S252 would be able to assess the extent of the difference (e.g., a large difference when comparing to average differences in phone call frequency) in phone call frequency. Alternatively, the extent of differences between digital fingerprints or values of properties of digital fingerprints can be compared against probability thresholds that relate to the probability that there would be the observed extent of difference between the digital fingerprints.

In a third variation, comparison of digital fingerprints as in Block S252 can additionally or alternatively identify incompatibility differences such as operating system version number decreases, incompatibility of the application identifier and an operating system, or any suitable pattern of properties that indicates unusual or impossible trends in a device history. Such an incompatibility difference could allow an operating system to upgrade to new versions while confirming the device is the same. However, any additional or alternative approach may be used in comparing digital fingerprints for analyzing a digital fingerprint for generating a concern metric. The result of the comparison is preferably an indication that the digital fingerprint corresponds to a device history associated with the type of request received in Block S210, or does not correspond to the device history.

2.5.2.A Analyzing a Digital Fingerprint: Generating a Model.

Analyzing a digital fingerprint as in Block S250 can additionally or alternatively include generating a model as in Block S255, and analyzing based on the model as in Block S256.

Block S255, which includes generating a model, functions to generate a model to be used in analyzing a digital fingerprint. Preferably, the model is generated and stored at a remote server or database. The model is preferably retrieved through a wireless network (e.g., WiFi, cellular network, etc.), but can alternatively stored and/or retrieved through a wired connection or through any other suitable communications link. Preferably, the model is a concern metric model that outputs the concern metric associated with the authentication transaction. However, the model can generate any other suitable output associated with the authentication transaction. The retrieved model is preferably generated based on generated digital fingerprints (e.g., stored digital fingerprints, reference digital fingerprints discussed with respect to Block S251, etc.), but can additionally or alternatively be generated based on client properties directly and/or any other suitable data.

In a first variation, a retrieved concern metric model is generated from features of digital fingerprints associated with a single user. Preferably, the single user is associated with the second client operating on the second client device, where for example, the user is the owner of a user account that the first client attempted to login into. Alternatively, the retrieved model is generated from digital fingerprints associated with a user that is not directly affiliated with the request of the first client. However, the retrieved model can be generated from features of any suitable digital fingerprints. Preferably, the model is generated based on features from digital fingerprints across every user account associated the user. Alternatively, the model can be generated based on features from digital fingerprints associated with a single user account of the user. However, the model can be generated from digital fingerprints not associated with user accounts of the user. The model can be generated from both legitimate and illicit digital fingerprints associated with the digital fingerprint history for the user account. Alternatively, the model can be generated only from legitimate digital fingerprints exclusively or illicit digital fingerprints exclusively. However, any type of digital fingerprint associated with the digital fingerprint history for the user account can be used in generating the retrieved model. In an example of the first variation, the retrieved model is generated based on sets of device usage features from a set of digital fingerprints, each digital fingerprint having a set of device usage features, and each digital fingerprint belonging to a digital fingerprint history associated with the user.

Figure 6:
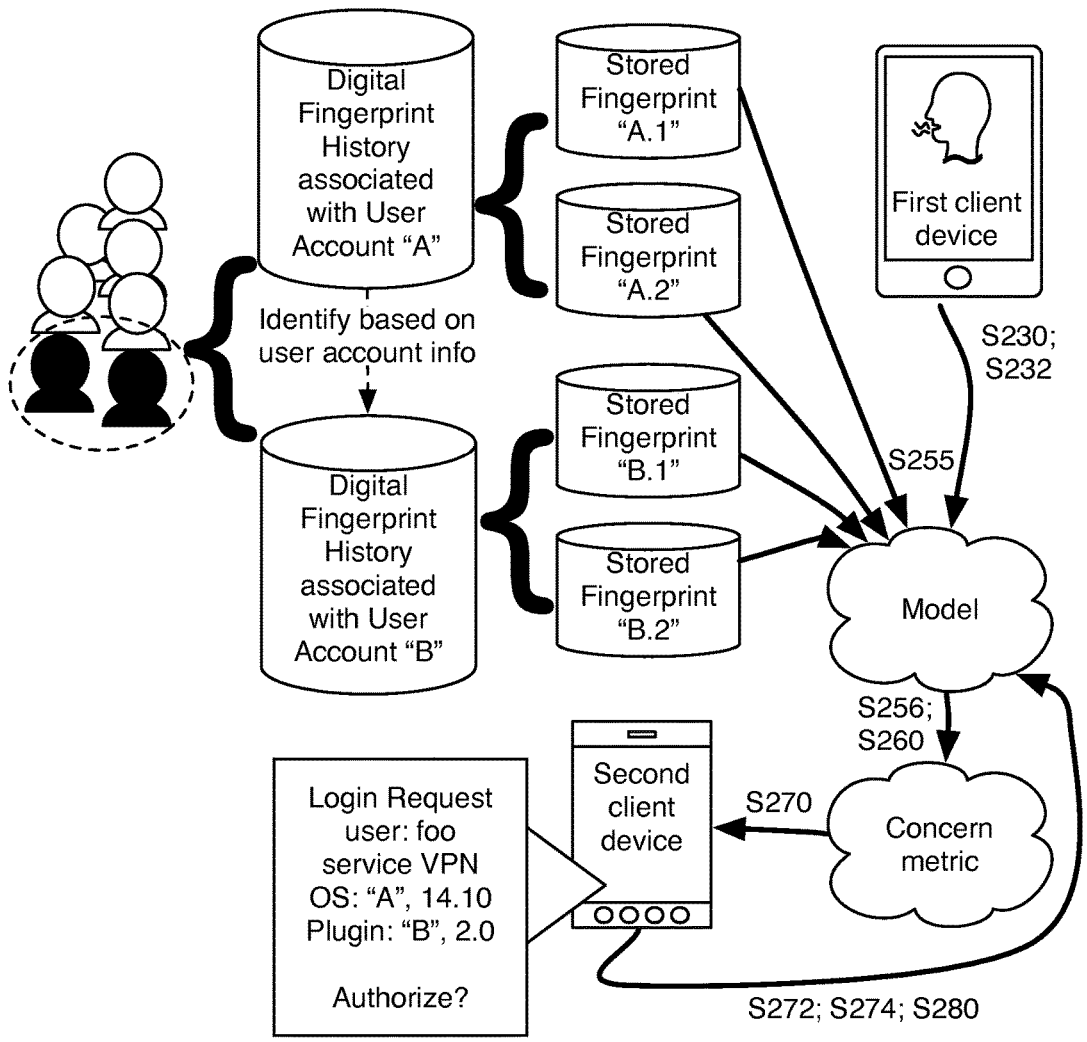
FIG. 6 is a diagram of the method of a preferred embodiment.

As shown in FIG. 6, in a second variation, the retrieved model is generated from features of digital fingerprints associated with multiple users. The training set for the retrieved model can incorporate digital fingerprints of an institution, a geographic region, an application, a network and/or from a digital fingerprint pool of any suitable scope. For example, if Block S210 receives a request associated with an institution (e.g., a login request to a university student account), the model retrieved could have been generated from the pool of digital fingerprints that have been generated in response to preceding requests associated with the institution (e.g., previous login requests to all student accounts of the university). In another example, retrieving a model can include generating a model based on a multiple sets of stored digital fingerprints (e.g., a first set of digital fingerprints and a second set of digital fingerprints) associated with multiple user accounts. In such an example, generating the model can include identifying a second or Nth set of stored digital fingerprints associated with a second or Nth account. Identifying the Nth set of stored digital fingerprints can be based on user data associated with the first user account, the Nth user account, a client, an institution, an affiliation, and/or any other suitable entity. The scope of the training set for the retrieved model can also be based on a property collected in Block S232 or on a property of the digital fingerprint generated in Block S230. For example, if a client property collected in Block S232 was that the first client used browser "A" in initiating the relevant request, then the retrieved model can be composed of only user digital fingerprints where the browser "A" was used.

In a third variation, the retrieved model is selected based on the degree of digital fingerprint history collected for a user. Preferably, if digital fingerprint history specifically collected for a user is sparse, the retrieved model can be a model generated from features of digital fingerprints associated with multiple users. For example, for a login attempt immediately subsequent to creating a new account with a service provider, the retrieved model can be a model generated from features of digital fingerprints associated with multiple users (e.g., from a global digital fingerprint history across all users of the service provider). If the digital fingerprint history collected for a user is comprehensive, then the retrieved model can be a model solely generated from features of digital fingerprints associated with the user. However, the type of model retrieved can be based on any criteria with respect to a user digital fingerprint history and/or any other suitable component.

2.5.2.B Analyzing a Digital Fingerprint: Analyzing Based on a Model.

As shown in FIG. 6, Block S256, which includes analyzing based on a model, functions to analyze a digital fingerprint using a generated model. Preferably, the model used is the model generated and/or retrieved as in Block S255, but can also be any other suitable generated and/or stored model. Preferably, the model is used with an input of a feature set from properties of the digital fingerprint generated in Block S230. Alternatively or additionally, the feature set can include client properties collected in Block S232. However, the feature set can include any suitable data collected, generated, and/or stored in any of the steps of the method 200. Preferably, analyzing a digital fingerprint (E.g., the first client digital fingerprint) includes retrieving a generated model as in Block S255, and comparing the digital fingerprint (e.g., first client digital fingerprint) to the model. The output of the retrieved model is preferably a concern metric (e.g., a concern metric is generated based on analysis of a digital fingerprint using the retrieved model) assigned to the input digital fingerprint associated with a first client from which a request was received in Block S210. However, the output of the retrieved model can be any suitable output in relation to the authentication transaction.

Preferably, the model leverages a machine learning algorithm that is trained with a training dataset including training samples, each training sample associated with a set of features. Alternatively, any type of model can be employed in analyzing a given digital fingerprint. In variations, the machine learning algorithm can be characterized by a learning style including any one or more of: supervised learning (e.g., using logistic regression, using back propagation neural networks), unsupervised learning (e.g., using an Apriori algorithm, using K-means clustering), semi-supervised learning, reinforcement learning (e.g., using a Q-learning algorithm, using temporal difference learning), and any other suitable learning style. Furthermore, the machine learning algorithm can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm.

In one variation, for a training dataset used with a machine learning model, the labels for the training samples are obtained based on a user response. Preferably, the labels are binary indications of whether the given training digital fingerprint sample is a legitimate digital fingerprint or an illicit digital fingerprint. Alternatively, the labels are non-binary concern metrics (e.g., a similarity score, a concern metric from 1 to 10, etc.). However, the labels can be any suitable indication of the suspiciousness of the associated digital fingerprint. Preferably, the training samples are labeled by users in response to a request to confirm the legitimacy or illegitimacy of first client login requests to user accounts associated with the user. For example, a first client can request a login to a user account, a digital fingerprint can be generated for the first client as in Block S230, features from the digital fingerprint can be used with a retrieved machine learning model as in Block S255, a concern metric can be generated based on the features and the retrieved model as in Block S260 discussed below, a notification can be sent to the user based on the concern metric such as in Block S270 discussed below, and a user can respond to the notification with an indication that the generated digital fingerprint is legitimate or illicit. The user indication can be used as a label for the generated digital fingerprint in regenerating the retrieved machine learning model with an updated training dataset such as in Block S280 as discussed below.

2.6 Generating a Concern Metric.

As shown in FIGS. 3, 5, 6, and 8, Block S260, which includes generating a concern metric, functions to generate a concern metric indicating a degree of suspiciousness associated with the authentication transaction. Preferably, generating a concern metric is based on the analysis of a digital fingerprint as in any combination of Block S250, S251, S252, S255, S256, but can also be based on any other suitable step or entity. Generating a concern metric will preferably include assessing the veracity (e.g., is a legitimate client, a phishing site, an illicit proxy client, etc.) of whichever client device is consuming a service for authentication. However, the concern metric can be in any appropriate form to indicate the level of concern or suspiciousness associated with a client, an authentication device, a user account, a user, an affiliation, a request, an authentication transaction, and/or any other suitable entity. Preferably, the concern metric is generated in response to the analysis of a digital fingerprint as in Block S250. Alternatively, the concern metric can be generated at a subsequent or preceding time, and/or in relation to the timing of any of the other steps of the method 200. Preferably, the concern metric is generated through processing the digital fingerprint generated for the first client. Alternatively, the concern metric is generated without the digital fingerprint, such as by using the collected client properties of the first client. However, the concern metric can be generated in any other suitable manner using any suitable data. Preferably, the concern metric is generated through a model trained on a training set. Alternatively, the concern metric can be generated through a set of rules applied in comparing the digital fingerprint of the first client to stored digital fingerprints within a digital fingerprint history. However, the concern metric can be generated based on the digital fingerprint of the first client alone, and/or generated based on any suitable component. Generating a concern metric preferably checks that a device signature or device fingerprint for a particular authentication transaction instance conforms to expected digital fingerprint patterns for a particular account or context. Alternatively, generating a concern metric can assess whether a digital fingerprint fits within expected patterns observed across multiple accounts, users, groups, affiliations, devices, contexts, and/or other suitable entities.

With respect to form, the generated concern metric is preferably numerical (e.g., a concern metric from 1 to 10 with 10 being a maximum level of concern or suspiciousness, a probability that the login request is unauthorized, etc.). Alternatively, the concern metric can be language-focused (e.g., low, medium, or high level of concern). The concern metric is preferably non-binary, but is alternatively a binary indication (e.g., matching/non-matching, illicit digital fingerprint/legitimate digital fingerprint, concern/no concern). Alternatively or additionally, the concern can include a similarity score (e.g., between digital fingerprints, clients, users, user accounts, digital fingerprint histories, etc.), a recommendation to perform an action (e.g., for the user to authenticate, to authenticate automatically, to deny authentication, to reset username/password, to provide further credentials, etc.), and/or any other suitable information relevant to the suspiciousness of the first client. However, the concern metric can be of any suitable form to indicate the suspiciousness of an entity.

2.7 Notifying.

As shown in FIGS. 3-6 and 8, Block S270, which includes notifying, functions to notify an entity about information pertaining to the authentication transaction. Preferably, a user is notified, but an administrator, a group of users, members of an institution, and/or any other suitable entity can be notified. Notifying a user preferably includes notifying a user that a login request may have originated from an unauthorized source, but can additionally or alternatively include notifying a user regarding any other information regarding the suspiciousness of the authentication transaction or the authentication transaction in general. Preferably, the notification is in response to the concern metric exceeding a threshold level. Alternatively, a notification can be generated irrespective of the degree of concern metric. However, a notification can be generated in response to any suitable stimulus. Preferably, the content of the notification is based on the degree of concern metric as well as the digital fingerprint of the first client. As shown in FIGS. 7A-7F, the notification content can include presenting the concern metric (e.g., a similarity score, a level of suspiciousness associated with the first client, etc.), recommendations (e.g., suggestion to authenticate or deny the authentication request, etc.), options (e.g., option to authorize or deny authorization to a request or authentication transaction, option to update or bypass updating the digital fingerprint history with the digital fingerprint of the first client, option to change the password of a user account, option to notify other users or third-parties, option to lock a user account such as the first user account, etc.), or any suitable content related to the authentication transaction. The notification is preferably communicated to and presented on a second device, preferably one used in confirming a 2FA request. The information is preferably presented in a form that enables a user to identify and to confirm/deny irregularities.

In a first variation, the content of the notification is based upon the degree of concern metric generated in Block S260. In a first example of the first variation, if the digital fingerprint similarity vector is within a first threshold, then Block S270 may only include information about the questionable device properties, and if the digital fingerprint similarity vector is within a second threshold, then Block S270 may result in explicit confirmation by a user of the questionable device properties.

In a second example of the first variation, a first client that has a client fingerprint substantially matching a previously encountered digital fingerprint is preferably evaluated as no or low threat. A second client is preferably not notified, and the digital fingerprint information that is exposed can be kept to a default level. In an illustration, device type may be used. Alternatively no device information may be exposed in the device of the additional layer of authentication.

Figure 7A:
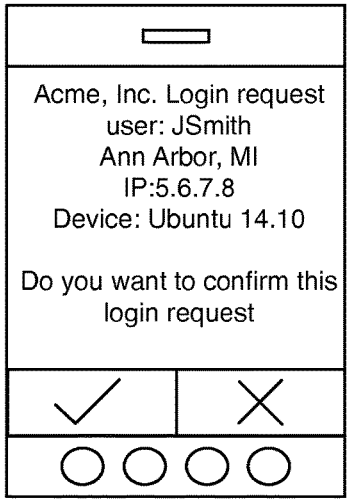
FIGS. 7A-7F are graphical representations of the method of preferred embodiments for notifying an entity.

In a third example of the first variation, a first client can be assigned a moderate concern metric when the client fingerprint doesn't have an exact match with historical fingerprint records but has a fingerprint that is determined to likely be the legitimate user using a new device/application or using a device in a new environment. A second client may be notified but the authentication transaction concerns can be exposed using a low-concern approach as shown in FIG. 7A. For example, an involved-client concern notification may state, "You appear to be using a new device. Press OK to confirm". In this variation, confirming the authentication can be the default action. The user may be offered the opportunity to add the new device to their history (e.g., indicate this is a commonly used device by the user) or to prevent saving the new device to their history (e.g., indicate they will not be commonly using this device).

Figure 7B:
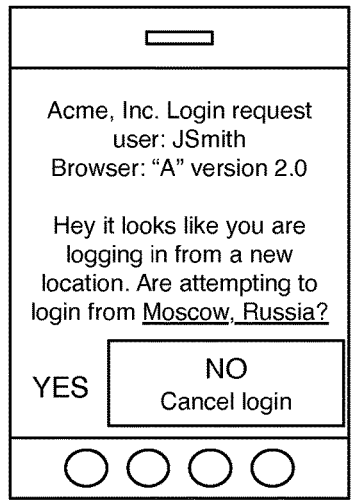
Figure 7C:
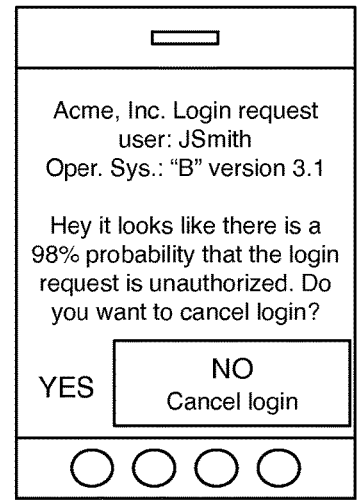
Figure 7D:
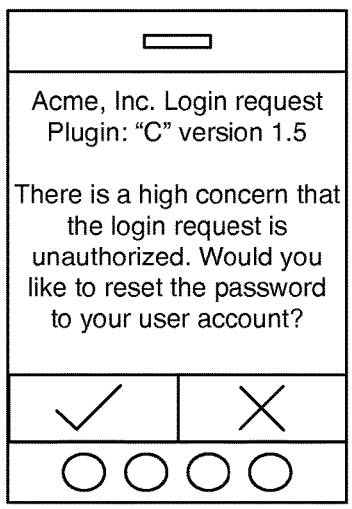
Figure 7E:
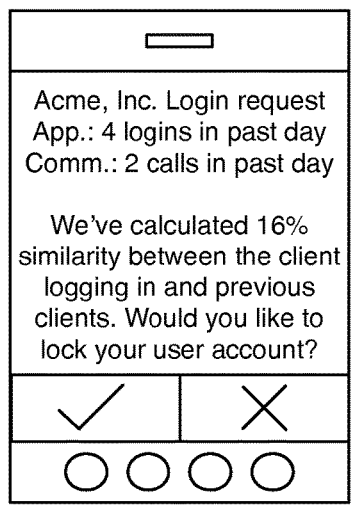
Figure 7F:
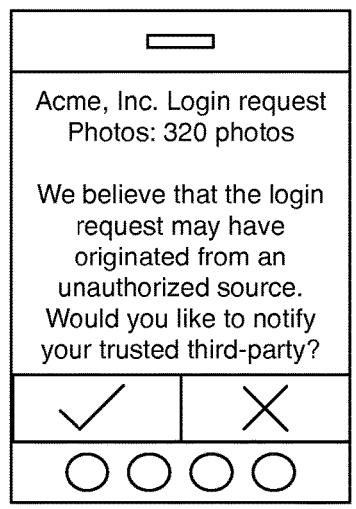

In a fourth example of the first variation, a first client can be assigned a high concern metric when a client fingerprint of a current authentication transaction does not match any properties and has a high probability of being used in an attack. With a high concern metric, the second client may be triggered to display a warning message where the default or suggested response is to cancel to the authentication as shown in FIG. 7B. For example, a 2FA app may display the message, "This login attempt appears to be originating from an unexpected location in Russia. You may be the victim of an attack attempt and should cancel the login and contact your IT administrator. If you are sure this is normal, confirm below."

In a fifth example of the first variation, a generated concern metric for the first client digital fingerprint can indicate a similarity score between the first client digital fingerprint and other digital fingerprints in the digital fingerprint history associated with the authentication transaction. In an illustration of a fifth example, a similarity score of 98% similarity to the digital fingerprint history is indicated by the generated concern metric, and the generated notification can include the similarity score.

2.8 User Response.

Block S272, which includes receiving a user response, functions to receive a communication regarding the authentication transaction. Block S272 can additionally or alternatively include Block S274, which includes processing the user response. Preferably, the user response is received in response to a notification presented to the user as in Block 8250. Alternatively, the user response can be independent of a notification. However, the user response can be in response to any suitable step of the method 200. The user response is preferably received wirelessly (e.g., via WiFi, Bluetooth, SMS, etc.) from the second device used in a 2FA request, but can alternatively be received through a wired electrical connection (e.g., a micro-USB connector, a USB on-the-go connector, a Firewire connector, a Lightning Connector™) or by any other suitable device. However, the request can be received through any suitable means by any suitable entity.

In one variation, the user response includes a user's selection to an option presented in the notification generated as in Block S270. For example, a user may be requested to select from multiple choice digital fingerprint information. In another example, a user (e.g., an owner of a user account, an administrator, a trusted affiliate, security personnel, etc.) may be requested to rate the concern metric of a digital fingerprint of a requesting first client (e.g., from 1-10 on level of suspiciousness, legitimate or illicit, etc.).

The method 200 can additionally include notifying an additional entity and receiving a response from that additional entity. In one variation, the additional entity is an authorizing entity (e.g., a third client that provides authorization approval for an authentication request). In another variation, the additional entity could be an administrator of the service, the owner of the account, or any suitable person, system, or destination that could respond to the notification.

2.8.1 User Response: Processing a User Response

Block S274, which includes processing a user response, functions to perform actions associated with the authentication transaction based on the user response. Preferably, the processed user response is the user response received in Block S272, but can alternatively be any suitable response received from any suitable user associated with the authentication transaction.

In one variation, processing the user response includes authenticating or denying the authentication request. Preferably, the selection of whether to authenticate or deny the authentication request is based on the response given by the user. For example, if the notification generated in S270 included multiple choice digital fingerprint information, and if the user's selection does not match the actual digital fingerprint information for the current transaction, then the authentication transaction may be denied. In another example, if the notification generated in S250 included client properties of the first client and a request to confirm the client properties, then whether the user confirms or denies the transaction concerns will dictate whether the authentication service subsequently authorizes or denies the request of a first client. In a further example, the response of the user is processed with the concern metric generated as in Block S260 in order to come to an authentication decision (e.g., the user response and the generated concern metric are weighted and used as variables in the authentication decision). However, the selection of whether to authenticate or to deny the request can be decided through any suitable means In a second variation, processing the user response includes taking actions in response to identifying an illicit digital fingerprint. In such a situation, the user's unique identifier (e.g., unique identifier such as a username/password, fingerprint, voice activation, primary credentials, social security number, bank account number, etc.) may have been compromised. Example actions that can be taken in processing the user response can include changing the password for the compromised user account or associated accounts, prompting the user to logout, suggesting that the user take a particular action, notifying the user of the situation, notifying other user accounts associated with the authentication transaction, notifying a third-party, deactivating an account, locking an account, etc. For example, a notification generated as in S260 can be displayed at a second device involved in the 2FA, where the notification includes a request for the user to confirm or deny the transaction concerns exposed in the notification. If the user denies the transaction concerns (e.g., labeling the first client digital fingerprint as illicito), then the user can be presented with a link to the account settings of the service provider for resetting or changing the password associated with the compromised user account.

2.9 Receiving a Policy Configuration

As shown in FIG. 4, Block S275, which includes receiving a policy configuration, functions to receive a communication by a user for configuring elements of the authentication transaction. Preferably, the policy configuration is received wirelessly through the service provider associated with the user and the authentication service. Alternatively, the policy configuration can be received directly by the user through a wireless or wired means. However, the policy configuration can be received by any suitable entity in any suitable fashion. The policy configuration can allow customization at the level of a per user, per user account, per group of users or user accounts (e.g., of an institution, affiliation, group, etc.), per digital fingerprint history, per application, per authentication transaction basis and/or customization at any scope related to the authentication transaction. The policy configuration can set different thresholds and limits associated with the authentication transaction (e.g. concern metric threshold, limits to digital fingerprint concerns, limit to number of digital fingerprints remembered for a particular user, etc.), notification settings (e.g., content included in the notification, basing the notification on degree of concern metric, who/when/how/where to send the notification such as setting to alert the user for all digital fingerprints other than a main device, enable/disable notifications), generation of concern metric settings (e.g., how reference digital fingerprints are selected, how digital fingerprints are compared, how the generated model is generated, which generated model is retrieved for a given situation, the type of machine learning model employed, the features used by the generated model, etc.). Examples of policy configurations regarding how the model is generated can include settings regarding the scope of digital fingerprints used as a training set for the generated model (e.g., institutional scope, device usage scope, global scope, network scope, application scope, etc.). However, any suitable settings can be set. The policy configuration can be stored in association with a user account, stored by the user device, stored on a server, or be stored in any other suitable manner. Receiving the policy configuration preferably includes performing the authentication transaction in accordance with the user selections.

2.10 Updating.

As shown in FIGS. 3-6, additionally or alternatively, the method 200 can include updating as in Block S280, which functions to update components used in outputting data associated with the authentication transaction. Preferably, updating occurs in response to receiving a user response as in Block S272, but can occur in relation to any suitable step of the method 200.

As shown in FIGS. 3-4, in a first variation, one or more sets of stored digital fingerprints are updated. Preferably, a set of stored digital fingerprints is updated with the digital fingerprinted generated as in Block S230 (e.g., a first client digital fingerprint), but a set of stored digital fingerprints can be updated with any suitable digital fingerprint associated with an authentication transaction. Preferably, a set of stored digital fingerprints is updated with a digital fingerprint based on the value of the concern metric generated as in Block S260. For example, as shown in FIG. 4, updating a set of stored digital fingerprints can include modifying the first set of stored digital fingerprints to include the first client digital fingerprint in response to the concern metric being below a threshold concern metric. Alternatively, a set of stored digital fingerprints can be updated based on a user response such as the received user response as in Block S272. For example, if a user is presented with an option to authorize a login request to a user account, and a user response is received indicating an authorization of the login request, then a set of stored digital fingerprints associated with the user account can be updated with the digital fingerprint generated in relation to the authentication transaction. Preferably, the updated digital fingerprint histories are digital fingerprints histories associated with the user involved with the 2FA transaction. Alternatively, global digital fingerprint histories across all users or subsets of users can be updated. However, any reference digital fingerprint or reference digital fingerprint history discussed in Block S251 can be updated in response to the user response, and/or any other suitable digital fingerprint history can be updated in response to any suitable stimuli.

As shown in FIGS. 5-6, in a second variation, a model as in Block S255 and S256 is updated. Preferably, the updated model is able to generate concern metrics using input features from generated digital fingerprints as in Block S230. However, the updated model can output any suitable component associated with the authentication transaction. Preferably, the updated model is a newer version of the model generated in Block S255 and used in generating the concern metric in Block S256, and regenerating the model preferably includes updating the training set to include the digital fingerprint generated in Block S230 and a label based on a user response received in Block S272. For example, a target digital fingerprint is generated for a first client requesting access to a bank account, a generated model based on digital fingerprints across all bank accounts is retrieved and used to generate the concern metric associated with the target digital fingerprint, a notification exposing transaction concerns is sent to a second client device in the 2FA, a user of the second client device responds that the target digital fingerprint is legitimate or illicit, and the retrieved model is updated with a training set including the target digital fingerprint and an associated description of legitimate or illicit. As such, blocks of the method 200 can facilitate presenting the user with an option to authorize the login request in response to the concern metric exceeding a threshold concern metric; receiving a user response to the option, where the user response comprises an indication to authorize or deny authorization to the login request; and updating the model based on the user response and the first client digital fingerprint.

Preferably, the updated model is used in subsequent authentication transactions in generating a concern metric. Alternatively, both the generated model and the updated model can be used in generating the concern metric. However, any combination of generated or updated models can be used in the authentication transaction.

2.11 Evaluating Client Match

Figure 8:
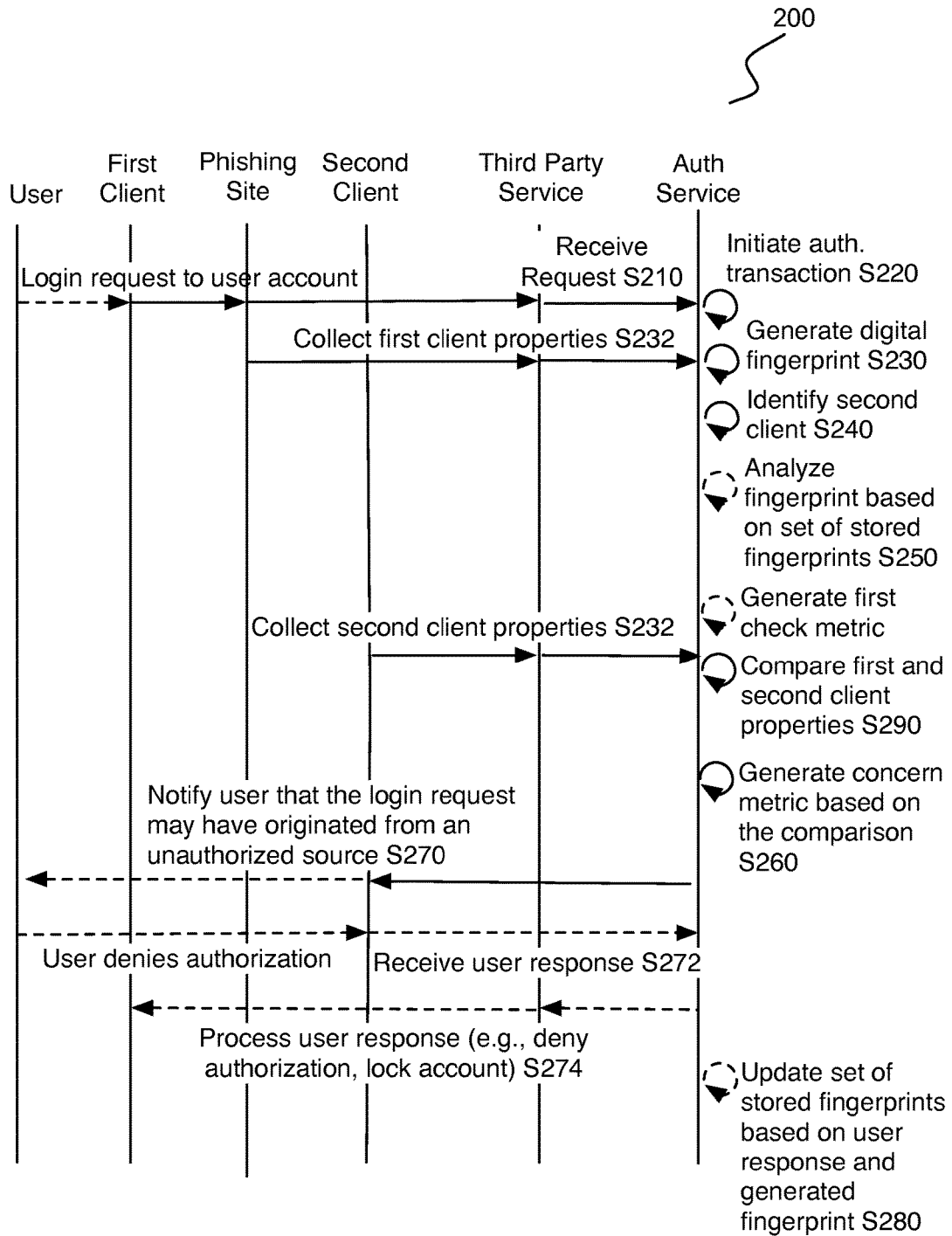
FIG. 8 is a communication flow diagram of the method of a preferred embodiment.

As shown in FIGS. 8-9, additionally or alternatively, an embodiment of the method 200 can include Block S290, which includes comparing a first and second client in an authentication transaction, and which functions to perform a client match process that verifies that properties of the second client corresponds to that of the first client. If the two devices differ along particular properties, then the authentication transaction can be automatically denied. Preferably, the types of client properties include the types of client properties discussed with respect to Block S232. However, the types of client properties can include any additional suitable client property types. Preferably, evaluating a client match can include any approach analogous to comparing digital fingerprints or concern metric generation as discussed in Blocks S250, S251, S252, S255, and S256. In some variations, the first client and second client applications may operate on the same device. As such, matching intrinsic device information, or similar device usage patterns may be an expected result of comparison of the two clients. The second embodiment of the method 200 preferably utilizes the connected/online nature of a push- or app-based authentication application for the second client. Real-time information can be collected from the second client at the time of authentication. Evaluating a client match will preferably include denying authentication when the evaluation of a client match indicates a non-match scenario. Authentication transactions preferably proceed in an un-augmented manner when the client match evaluation is satisfied.

Evaluating client match preferably includes collecting client properties from the first and second client. This can be performed substantially similarly to Block S232. First client properties from the first client and second client properties from the second client are preferably collected during the authentication transaction, but can additionally or alternatively be collected at any suitable time outside the authentication transaction period. Preferably, only compared client information may be collected, but any amount or type of client properties can be collected irrespective of the client properties actually compared. In other words, one variation does not require a device history or full digital fingerprint such as that generated in Block S230. Preferably, evaluating a client match includes verifying that device usage, device operation, and/or other properties of the second client matches device usage, device operation, and/or other properties of the first client. For example, evaluating a client match between the first and the second client can include evaluating the similarity across the clients with respect to browser version/user-agent, operating system version, device type, device capabilities, application identifiers, screen resolution, screen size, functionality support, and/or any other suitable device usage property. Alternatively or additionally, evaluating a client match includes verifying geographic properties of the second client matches the geographic properties of the first client, which functions to ensure that the first and second client originate within the substantially corresponding physical locations. Verifying geographic properties can verify that the first client and the second client are being operated within a defined boundary. Location can be derived from various sources such as on-device GPS, AGPS, cell tower triangulation, Wi-Fi triangulation, SS7 location lookup, IP address-based location, or other suitable positioning approaches. The comparison of location can be handled with varying granularity. The location can be compared based on country, state, or region. Similarly, the location can be compared based on estimated distance between the first and second device. Policy could define different geographic granularities for different accounts, authentication transaction types, or other properties. For example, the geographic granularity may be increased if the digital fingerprint of the first client has a low correspondence to device history of the account. Other properties of the second client may additionally be compared. For example, a requirement may be set that the two clients be on the same network, be performed on the same physical device type, have similar environment sensor readings (e.g., temperature, barometric pressure, motion patterns, etc.), or any suitable property patterns.

As shown in FIG. 8, in a first variation the client match process can be used as an additional layer of authentication that is applied within the authentication service platform. For example, generating the concern metric as in Block S260 can include generating the concern metric based on a comparison between the set of first client properties and the set of second client properties. Preferably, generating the concern metric includes comparing the first client properties and the second client properties in parallel with analyzing a digital fingerprint based on the set of stored digital fingerprints as in Block S250. Alternatively, comparing the client properties can be performed in serial with analyzing a digital fingerprint as in Block S250. For example, as shown in FIG. 8, generating the concern metric can include generating the generating a first check metric based on the analysis of the first client digital fingerprint, and in response to the first check metric being below a first check metric threshold, comparing the set of first client properties to a set of second client properties collected from the second client. The first check can be a concern metric or a separate metric. However, comparing the set of first client properties and the set of second client properties can be performed in any suitable manner in combination with analyzing a digital fingerprint.

As shown in FIGS. 8 and 9, in a second variation, the client match process can be used independently of analyzing the first client digital fingerprint based on the first set of stored digital fingerprints as in Block S250. For example, a concern level can be generated based on comparing the set of first client properties with the set of second client properties irrespective of analyzing or generating a digital fingerprint. When used independently, the method 200 can include, for example, collecting first client information during initializing an authentication transaction, transmitting a two-factor authentication request to a second device, collecting second client information during receipt of the two-factor authentication response, and evaluating a match of the first and second client, and permitting authentication at least partially conditional on a result from evaluating the match of the first and second client.

However, comparing sets of client properties as in Block S290 can be performed with or to the exclusion of any suitable Block of the method 200.

The system 100 and method 200 of the preferred embodiments and variations thereof can be embodied and/or implemented at least in part as a machine configured to receive a computer-readable medium storing computer-readable instructions. The instructions are preferably executed by computer-executable components preferably integrated with the multifactor authentication system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for multi-factor authentication with a first client operating on a first client device, comprising:
   receiving a login request, the login request associated with a first user account, from the first client;
   in response to receiving the login request, initiating an authentication transaction;
   generating a first client digital fingerprint from a set of first client properties collected from the first client;
   identifying a second client, the second client operating on a second client device, from data associated with the first user account;
   analyzing the first client digital fingerprint based on a first set of stored digital fingerprints, wherein analyzing the first client digital fingerprint comprises:
     generating a machine learning model trained using at least the first set of stored digital fingerprints as a training set, and
     evaluating the first client digital fingerprint using the machine learning model;
   generating a concern metric based on the analyzing of the first client digital fingerprint;
   in response to the concern metric exceeding a threshold concern metric, providing to the second client an authentication request notifying a user that the login request from the first client may have originated from an unauthorized source, wherein the authentication request to the second client comprises 1) the concern metric comprising a probability value that the login request by the first client is unauthorized, and 2) one or more suggested authorization options, wherein content of the suggested authorization options is determined based on degree of the concern metric;
   receiving a user response to the authentication request, wherein the user response comprises one of an authorization or denial of the login request;
   updating the training set to include the generated first client digital fingerprint and a label based on the received user response; and
   updating the machine learning model using the updated training set.

2. The method of claim 1, further comprising:
   receiving from the second client a user response to the authentication request, wherein the user response comprises an authorization of the login request submitted by the first client; and
   updating, based on the received user response, the first set of stored digital fingerprints to include the first client digital fingerprint.

3. The method of claim 1, wherein analyzing the first client digital fingerprint further comprises comparing the first client digital fingerprint to the first set of stored digital fingerprints; wherein generating the concern metric comprises generating the concern metric based on similarity between the first client digital fingerprint and stored digital fingerprints of the first set of stored digital fingerprints.

4. The method of claim 1, wherein generating the machine learning model comprises:
identifying a second set of stored digital fingerprints associated with a second user account; wherein the second set of stored digital fingerprints and the first set of stored digital fingerprints have no shared input features, and
generating the machine learning model trained using both of the first set and the second set of stored digital fingerprints as a training set.

5. The method of claim 4, further comprising identifying the first user account as one of a set of user accounts associated with an organization; and selecting the second user account from the set of user accounts associated with the organization.

6. The method of claim 1, wherein the first set of stored digital fingerprints comprises digital fingerprints stored from previous authentication transactions associated with the first user account.

7. The method of claim 1, further comprising receiving authentication policy configuration data from the user; wherein the threshold concern metric is set according to the authentication policy configuration data.

8. The method of claim 1, wherein analyzing the first client digital fingerprint further comprises analyzing device usage tracked over time, wherein analyzing device usage comprises analyzing at least one of: application usage, communication patterns, and location.

9. The method of claim 1, wherein analyzing the first client digital fingerprint further comprises analyzing device operation, wherein analyzing device operation comprises analyzing at least one of: a browser version, an operating system version, and a plugin version.

10. The method of claim 1, further comprising comparing the set of first client properties to a set of second client properties collected from the second client; wherein generating the concern metric comprises generating the concern metric based on the comparing between the set of first client properties and the set of second client properties.

11. The method of claim 1, wherein generating the concern metric comprises:
generating a first check metric based on the analyzing of the first client digital fingerprint;
in response to the first check metric being below a first check metric threshold, comparing the set of first client properties to a set of second client properties collected from the second client; and
generating the concern metric based on both of the analyzing of the first client digital fingerprint and the comparing between the set of first client properties and the set of second client properties.

12. The method of claim 1, wherein the suggested authorization options include at least one of: an option to reset authentication credentials associated with the first user account, an option to lock the first user account, and a notify option to notify a third party of attempted unauthorized account access.

13. A method for multi-factor authentication with a first client operating on a first client device, comprising:
receiving a login request, the login request associated with a first user account, from the first client;
in response to receiving the login request, initiating an authentication transaction;
identifying a second client, the second client operating on a second client device, from data associated with the first user account;
generating a first client digital fingerprint from a set of first client properties collected from the first client;
generating a second client digital fingerprint from a set of second client properties collected from the second client;
generating a machine learning model trained using the set of first client properties and the set of second client properties as a training set;
comparing, using the machine learning model, the first client digital fingerprint to the second client digital fingerprint;
generating a concern metric based on the comparing of the first client digital fingerprint and the second client digital fingerprint;
in response to the concern metric exceeding a threshold concern metric, providing to the second client an authentication request notifying a user that the login request from the first client may have originated from an unauthorized source, wherein the authentication request to the second client comprises 1) a display of the concern metric comprising a probability value that the login request by the first client is unauthorized and 2) one or more suggested authorization options, wherein content of the suggested authorization options is determined based on degree of the concern metric;
receiving a user response to the authentication request, wherein the user response comprises one of an authorization or denial of the login request;
updating the training set to include the generated first client digital fingerprint and a label based on the received user response; and
updating the machine learning model using the updated training set.

14. The method of claim 13, wherein comparing the first client digital fingerprint to the second client digital fingerprint comprises comparing at least one of: browser version, operating system version, and plugin version.

15. The method of claim 13, wherein the suggested authorization options include at least one of: an option to reset authentication credentials associated with the first user account, an option to lock the first user account, and a notify option to notify a third party of attempted unauthorized account access.

* * * * *